(12) United States Patent
Zaifman et al.

(10) Patent No.: US 9,111,035 B2
(45) Date of Patent: Aug. 18, 2015

(54) METHODS, SYSTEMS, AND COMPUTER PROGRAM PRODUCTS FOR ANALYZING AN OCCURRENCE OF AN ERROR IN A COMPUTER PROGRAM BY RESTRICTING ACCESS TO DATA IDENTIFIED AS BEING SENSITIVE INFORMATION

(75) Inventors: Arthur Zaifman, Millburn, NJ (US); John Mocenigo, Lebanon Township, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 528 days.

(21) Appl. No.: 12/901,919

(22) Filed: Oct. 11, 2010

(65) Prior Publication Data

US 2012/0089860 A1   Apr. 12, 2012

(51) Int. Cl.
*G06F 21/00* (2013.01)
*G06F 11/36* (2006.01)
*G06F 11/07* (2006.01)

(52) U.S. Cl.
CPC .......... *G06F 11/366* (2013.01); *G06F 11/0709* (2013.01); *G06F 11/0748* (2013.01); *G06F 11/0781* (2013.01)

(58) Field of Classification Search
USPC ................................................ 726/22; 714/2
See application file for complete search history.

(56) References Cited

U.S. PATENT DOCUMENTS

| 5,928,369 | A  | * | 7/1999  | Keyser et al. ............... 714/47.3 |
| 6,779,114 | B1 | * | 8/2004  | Chow et al. .................... 713/189 |
| 2003/0167459 | A1 | * | 9/2003  | Bates et al. ..................... 717/125 |
| 2007/0261124 | A1 | * | 11/2007 | Centonze et al. ............... 726/27 |
| 2008/0010233 | A1 | * | 1/2008  | Sack et al. ......................... 707/1 |
| 2008/0163382 | A1 | * | 7/2008  | Blue et al. ........................ 726/28 |

\* cited by examiner

*Primary Examiner* — Vikkram Bali
*Assistant Examiner* — Tracy Mangialaschi

(57) ABSTRACT

A method of analyzing an occurrence of an error in a computer program executing on a data processing system includes receiving data that are associated with an execution leg of the computer program at the time of the error and restricting access to at least a portion of the data associated with the execution leg of the computer program based on an identification of the portion of the data associated with the execution leg of the computer program as being sensitive information.

22 Claims, 10 Drawing Sheets

| Identity | Type | Range | Regex | Restrict | Transform |
|---|---|---|---|---|---|
| tier1 support | source | $src/*.ksh, $src/*.tcl | SPI_func_* | Y | N/A |

FIG. 5

| Identity | Type | Range | Regex | Restrict | Transform |
|---|---|---|---|---|---|
| tier1 support | source | $src/*.ksh, $src/*.tcl | SPI_func_* | Y | N/A |
| tier1 support | state | $src/* | spi_ssn_* | Y | |

| Identity | Type | Range | Regex | Restrict | Transform |
|---|---|---|---|---|---|
| tier1 support | source | $src/*.ksh, $src/*.tcl | SPI_func_* | Y | N/A |
| tier1 support | state | $src/* | spi_ssn_* | Y | |
| tier2 support | state | $src/* | spi_ssn_* | Y | Y |

FIG. 8

| Identity | Type | Range | Regex | Restrict | Transform |
|---|---|---|---|---|---|
| Tier2 (US) | state | cybersec_demo* | SPI_ssn | Y | |

```
if [ -z $LOGFILE ]
then  ===>>>
            LOGFILE=/tmp/logfile
fi
case $_SPI_ssn in
[0-9][0-9][0-9]-[0-9][0-9]-[0-9][0-9][0-9][0-9])
        ===>>>                              ===>>>  ;;
*)
        echo $_SPI_ssn >> $LOGFILE
        throw_alert CRIT "Invalid SSN"
```

FIG. 9

METHODS, SYSTEMS, AND COMPUTER PROGRAM PRODUCTS FOR ANALYZING AN OCCURRENCE OF AN ERROR IN A COMPUTER PROGRAM BY RESTRICTING ACCESS TO DATA IDENTIFIED AS BEING SENSITIVE INFORMATION

BACKGROUND

The present disclosure relates generally to computer program error management and, more particularly, to methods, systems, computer program products for computer program error management in a cloud computing environment.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

FIG. 1 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

When a computer program encounters an error, debug systems may be used to analyze the state of the computer program at the time the error occurred to determine the cause of the error and if maintenance work needs to be performed on the computer program. These debug systems may incorporate tools for analyzing function and/or stack back traces and associate the function, parameter, variable, constant and/or other names from the original source code with their values at the time the error occurred. The advent of cloud computing, however, introduces new considerations when debugging a software application running in the cloud. In contrast to a conventional computing environment where a client has control over the software applications and data it uses, in a cloud computing environment, this control is turned over to a cloud computing service provider. Details of the software application and associated data may then be revealed to the cloud computing service provider and/or a third party technical support organization that is involved in analyzing the cause of a software error. The details of the algorithms used in the software application and values for some or all of the data used in the application may be considered proprietary to the client or, possibly, Sensitive Personal Information (SPI) of the client's customers. For example, the client may be a bank and the software application may be a banking application that processes private financial data for the bank's customers. The client may be a hospital and the software application may be an application for processing patient medial records that by law are to be kept confidential. In some cases, laws may be in place that prohibit the release of information across some geographic boundary, such as a state boundary or country boundary.

Sensitive Personal Information may be leaked or exposed in various ways. As described above, debugging tools may reveal the values of program data and/or reveal algorithms used in the software application to the cloud computing service provider and/or a third party technical support organization.

The need to maintain confidentiality for program algorithms and/or data may inhibit the provision of certain types of software applications as cloud services. Moreover, the confidentiality of some types of software applications and data may be protected by law or other type of regulation that effectively prohibit the provision of such software applications and/or data as cloud services unless appropriate confidentiality safeguards are in place.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of analyzing an occurrence of an error in a computer program executing on a data processing system, comprising receiving data that are associated with an execution leg of the computer program at the time of the error and restricting access to at least a portion of the data associated with the execution leg of the computer program based on an identification of the portion of the data associated with the execution leg of the computer program as being sensitive information.

In other embodiments, the portion of the data associated with the execution leg of the computer program is identified as being sensitive information in the computer program.

In still other embodiments, the portion of the data associated with the execution leg of the computer program is identified as being sensitive information in a variable name.

In still other embodiments, the portion of the data associated with the execution leg of the computer program is identified as being sensitive information in a constant name In still other embodiments, the computer program is an object oriented computer program and the portion of the data associated with the execution leg of the computer program is identified as being sensitive information in a method name.

In still other embodiments, the computer program is an object oriented computer program and the portion of the data associated with the execution leg of the computer program is identified as being sensitive information in a class name.

In still other embodiments, the computer program is a procedural computer program and the portion of the data associated with the execution leg of the computer program is identified as being sensitive information in a function name.

In still other embodiments, the portion of the data associated with the execution leg of the computer program is identified as being sensitive information in a source file name of the computer program.

In still other embodiments, restricting access to at least the portion of the data associated with the execution leg of the computer program comprises restricting access to a value of a data item of the at least the portion of the data associated with the execution leg of the computer program, transforming the value of the data item of the at least the portion of the data associated with the execution leg of the computer program to generate a transformed value of the data item of the at least the portion of the data associated with the execution leg of the computer program, and allowing access to the transformed value of the data item of the at least the portion of the data associated with the execution leg of the computer program. The transformed value of the data item of the at least the portion of the data associated with the execution leg of the computer program alone cannot be used to determine the value of the data item of the at least the portion of the data associated with the execution leg of the computer program.

In still other embodiments, restricting access to at least the portion of the data associated with the execution leg of the computer program comprises restricting access to at least the portion of the data associated with the execution leg of the computer program based on geographic location.

In still other embodiments, the method further comprises restricting access to source code associated with the execution leg of the computer program.

In still other embodiments, restricting access to at least the portion of the data associated with the execution leg of the computer program comprises restricting access to a resource that is external to the computer program, the resource that is external to the computer program comprising the at least the portion of the data associated with the execution leg of the computer program.

In still other embodiments, the method further comprises identifying a variable associated with the resource that is external to the computer program, the variable having a state associated therewith on which the occurrence of the error in the computer program is at least partially based.

In still other embodiments, the method further comprises processing the resource that is external to the computer program to obtain a data item contained in the resource.

In still other embodiments, the method further comprises restricting access to a value of the data item contained in the resource, transforming the value of the data item contained in the resource to generate a transformed value of the data item contained in the resource, and allowing access to the transformed value of the data item contained in the resource. The transformed value of the data item contained in the resource alone cannot be used to determine the value of the data item contained in the resource.

In still other embodiments, transforming the value of the data item contained in the resource comprises defining a schema for transforming data contained in the resource that is external to the computer program and transforming the value of the data item contained in the resource based on the schema to generate the transformed value of the data item contained in the resource.

In still other embodiments, processing the resource that is external to the computer program to obtain the data item contained in the resource comprises identifying an operation based on a type of the resource that is external to the computer program and performing the operation on the resource that is external to the computer program to obtain the data item contained in the resource.

In still other embodiments, the method further comprises associating a navigation construct with the resource that is external to the computer program. The navigation construct facilitates access to the resource that is external to the computer program without revealing a location of the resource that is external to the computer program.

In still other embodiments, restricting access to the resource that is external to the computer program comprises defining a credential for accessing the resource that is external to the computer program, determining if an entity that requests access to the resource that is external to the computer program possesses the credential, and denying access to the resource that is external to the computer program when the entity does not possess the credential.

In still other embodiments, the method further comprises evaluating a status of the error and allowing access to the resource that is external to the computer program if the entity does possess the credential based on the status of the error.

In still other embodiments, evaluating the status of the error comprises determining that analysis of the error is complete. The method further comprising allowing read-only access to the resource that is external to the computer program.

In still other embodiments, evaluating the status of the error comprises determining that analysis of the error is in progress. The method further comprises allowing read access and write access to the resource that is external to the computer program.

Further embodiments provide an article of manufacture comprising a non-transitory computer readable storage medium having computer readable program code embodied therein. The computer readable program code comprises computer readable program code configured to compile an instruction in a computer program having a security level construct associated with the instruction, the security level construct being usable by an error management system to restrict access to a data item associated with the computer program.

In still further embodiments, the instruction that is compiled comprises a variable name.

In still further embodiments, the instruction that is compiled comprises a constant name.

In still further embodiments, the computer program is an object oriented computer program and wherein the instruction that is compiled comprises a method name.

In still further embodiments, the computer program is an object oriented computer program and wherein the instruction that is compiled comprises a class name.

In still further embodiments, the computer program is a procedural computer program and wherein the instruction that is compiled comprises a function name.

In still further embodiments, the security level construct is associated with all instructions in a source file of the computer program.

Other embodiments provide a method of modifying a computer program on a data processing system comprising injecting an instruction into the computer program on the data processing system, the instruction having a security level construct associated with the instruction, the security level construct being usable by an error management system to restrict access to a data item associated with the computer program.

In still other embodiments, the computer program is an interpreted language program.

Further embodiments provide an error management system for analyzing an occurrence of an error in a computer program executing on a data processing system comprising a memory comprising computer readable program code and a processor that is coupled to the memory and is configured to execute the computer readable program code so as to cause the data processing system to receive data that are associated with an execution leg of the computer program at the time of the error and to restrict access to at least a portion of the data associated with the execution leg of the computer program based on an identification of the portion of the data associated with the execution leg of the computer program as being sensitive information.

Other embodiments provide an article of manufacture, comprising a non-transitory computer readable storage medium having computer readable program code embodied therein. The computer readable program code comprising computer readable program code configured to receive data that are associated with an execution leg of the computer program at the time of the error and computer readable program code configured to restrict access to at least a portion of the data associated with the execution leg of the computer program based on an identification of the portion of the data associated with the execution leg of the computer program as being sensitive information.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which:

FIGS. 5-8 are block diagrams that illustrate policy configuration tables for analyzing the occurrence of an error in a computer program by restricting access to data identified as being sensitive information according to some embodiments;

FIG. 9 is a diagram of a code segment that illustrates computer program access to an external resource according to some embodiments;

DETAILED DESCRIPTION

Figure 1:
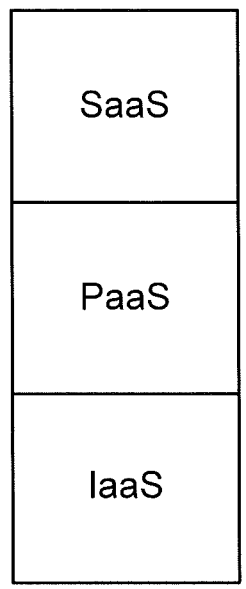
FIG. 1 is a block diagram that illustrates a conventional cloud computing paradigm.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments are described herein with respect to analyzing and debugging errors in a computer program. As used herein, the term "error" means any bug, flaw, mistake, failure, or fault in a computer program and/or system that produces an incorrect or unexpected result or causes the computer program and/or system to behave in an unintended way. Moreover, embodiments are described herein with reference to restricting access to sensitive information when analyzing information associated with the execution state of a computer program. As used herein, "sensitive information" means proprietary information, Sensitive Personal Information (SPI), and/or any type of protected information to which access may be restricted including, but not limited to, any entity, time, place, and/or location restrictions. Embodiments are further described herein with respect to a program inspection system interface server that facilitates that analysis of errors in a computer program by, for example, a program debugging system that is operated by a technical support organization. It will be understood that the program inspection system interface server may be used generally to restrict access to sensitive information associated with a computer program to other entities that seek access to the computer program and any data/information that is associated therewith. Such entities may include, but are not limited to, technical support personnel, audit personnel, software test personnel, application development personnel, and the like.

Some embodiments described herein are based on the creation of a logical firewall that receives data that are associated with a state of execution of a computer program at the time of an error and restricts access to some or all of the data that are identified as proprietary information or as Sensitive Personal Information (SPI) to only recipients that are authorized to review such data. In this way, a cloud computing service provider and/or a third party technical support organization may process and debug errors that occur in running a software application for a client while still preserving the confidentiality of the client's algorithms and/or data. The embodiments described herein may provide location independence between the execution of the computer program and the analysis of errors that may occur during execution, which may be beneficial as more end users seek to move their software applications away from their own systems and networks and into cloud computing environments.

Referring now to FIG. 1, a communication network 200 that includes a program inspection system interface server 210 that is configured to restrict access to proprietary information or Sensitive Personal Information (SPI) to authorized parties when analyzing an occurrence of an error in a software program. The communication network 200 comprises client devices 220a and 220b that communicate with a cloud computing service provider 230 over a network 240. The network 240 may represent a global network, such as the Internet, or other publicly accessible network. The network 240 may also, however, represent a wide area network, a local area network, an Intranet, or other private network, which may not accessible by the general public. Furthermore, the network 240 may represent a combination of public and private networks or a virtual private network (VPN). The network 240 includes a wireless base station transceiver 230 that may facilitate wireless communication with the mobile client device 220a.

The cloud computing service provider 230 comprises servers 250 and 255 that are configured with sufficient memory and data storage capabilities to run one or more applications for client devices, such as client devices 220a and 220b. While the cloud computing service provider 230 is shown as comprising two servers 250 and 255, it will be understood that the cloud computing service provider 230 may include any number of servers and that each of the servers may represent one or more physical servers or multiple virtual servers running on a single hardware platform. As shown in FIG. 1, the server 250 may communicate with a resource 260. This resource 260 may represent any resource external to a software application executing on the server 250, such as a log file, host, database, etc.

Figure 2:
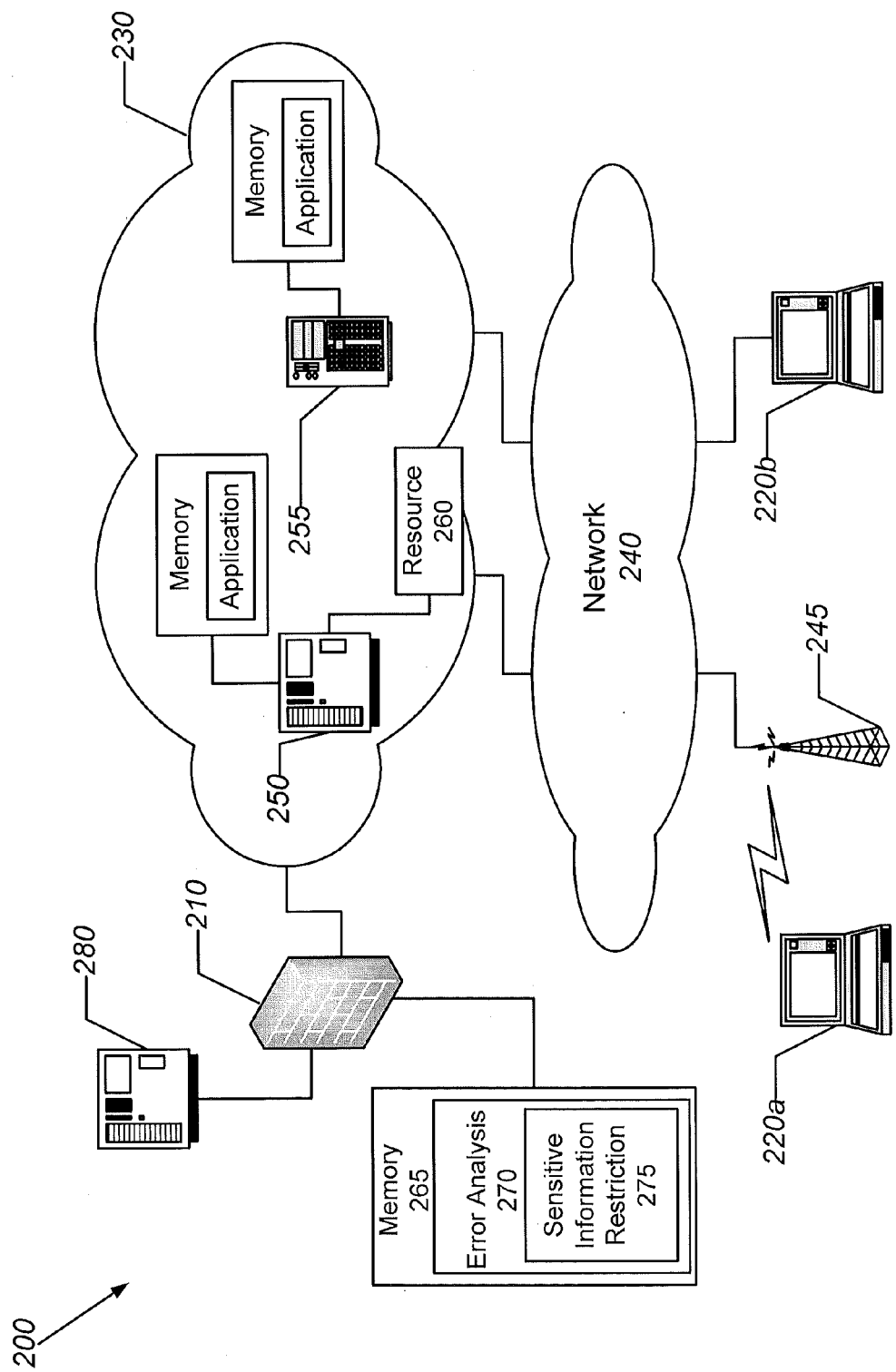
FIG. 2 is a block diagram of a communication network that includes a program inspection system interface server that is configured to analyze the occurrence of an error in a computer program by restricting access to data identified as being sensitive information according to some embodiments.

The program inspection system interface server 210 is configured to restrict access to proprietary information or Sensitive Personal Information (SPI) to authorized parties when analyzing an occurrence of an error in a software program. The program inspection system interface server 210 is equipped with a memory 265 that is representative of the one or more memory devices containing the software and data used to analyze an occurrence of an error in a computer program by restricting access to data identified as being sensitive information. The memory 265 may include, but is not limited to, the following types of devices: cache, ROM, PROM, EPROM, EEPROM, flash, SRAM, and DRAM. As shown in FIG. 2, the memory 265 may contain an error analysis module 270 that is configured to process data that is representative of the state of the computer program at the time an error has occurred. This data may include, but is not limited to, function back traces, stack back traces, specific data collected through debug tools, and the like. In some embodiments, the data collected by the error analysis module 270 may be encoded in an Extensible Markup Language (XML) format to facilitate processing of the data.

The error analysis module 270 comprises a sensitive information restriction module 275 that is configured to restrict access to data that is deemed to comprise proprietary information or Sensitive Personal Information (SPI) to only parties that are authorized to view the data. As described above, a client application running in the cloud computing service provider's infrastructure 230 may be susceptible to exposing confidential information as part of debugging an error in the client application. Examples of such information may include, but are not limited to, customer financial information, proprietary algorithms, patient medical records, information protected from release by law or regulation, and the like. The program inspection system interface server 210 may be a standalone server, may be a combination of multiple servers, or may be a combination of multiple virtual servers on a single hardware platform in accordance with various embodiments. The program inspection system interface server 210 may be part of the cloud computing service provider's infrastructure 230, may be part of a technical support architecture associated with a third party other than the cloud computing service provider or client, may be associated with one or more clients 220a and 220b to ensure security for their algorithms and data in the cloud computing service provider's infrastructure 230, or may be associated with a data security service that can be contracted by parties that wish to protect software algorithms and data from being exposed to technical support personnel and/or others when debugging errors in a computer program. The program inspection system interface server 210 may be viewed as an error management system that cooperates with the server(s) executing a computer program to process data associated with an error and selectively provide data to a technical support organization involved in analyzing and debugging the error so that sensitive personal information is not compromised.

A technical support server 280 is coupled to the cloud computing service provider 230 servers 250 and 255 via the program inspection system interface server 210. The technical support server 280 may be operated by a third party technical support organization or may be associated with the cloud computing service provider 230. The technical support server 280 may be used to debug computer program errors in the client software applications run in the cloud computing service provider infrastructure 230. As explained above, the program inspection system interface server 210 may be used to restrict access to proprietary information or Sensitive Personal Information (SPI) associated with the client applications run in the cloud computing service provider infrastructure 230 to authorized personnel during the error analysis and debug process.

Although FIG. 2 illustrates an exemplary communication network and an exemplary hardware/software architecture that may be used in a data processing system, such as the program inspection system interface server 210, for analyzing an occurrence of an error in a computer program by restricting access to data identified as being proprietary information or Sensitive Personal Information (SPI), it will be understood that the present invention is not limited to such a configuration but is intended to encompass any configuration capable of carrying out operations described herein.

Computer program code for carrying out operations of data processing systems and servers discussed above with respect to FIG. 2 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments. These flowchart and/or block diagrams further illustrate exemplary operations for analyzing an occurrence of an error in a computer program by restricting access to data identified as being sensitive information, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
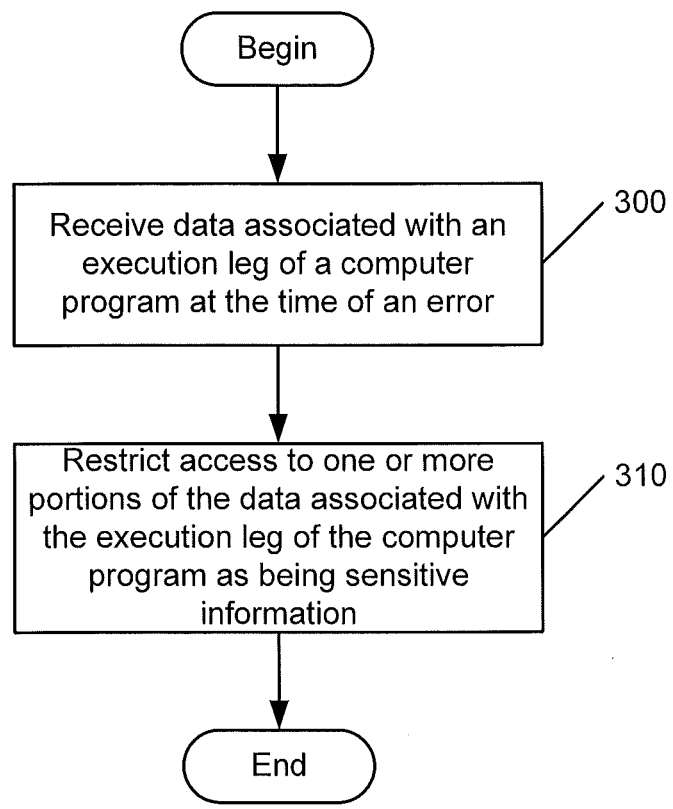
FIGS. 3 and 4 are flowcharts that illustrate operations for analyzing the occurrence of an error in a computer program by restricting access to data identified as being sensitive information according to some embodiments.

Referring now to FIG. 3, exemplary operations for analyzing an occurrence of an error in a computer program by restricting access to data identified as being sensitive information begin at block 300 where the program inspection system interface server 210 receives data associated with an execution leg of a computer program from a server running the computer program in the cloud computing service provider infrastructure 230. The data is representative of the state of the computer program at the time an error occurs. The program inspection system interface server 210 may process the data in conjunction with the original source code files to associate the data with the various variable names, constants, function names, method names, data structure names, and the like. In some embodiments, the associations between the raw data and the names from the source code files can be made using, for example, Extensible Markup Language (XML) tags. At block 310, the program inspection system interface server 210 restricts access to one or more portions of the data that are identified as being proprietary information or Sensitive Personal Information (SPI). Only authorized personnel may review the values for such data while other personnel, such as, for example, third party personnel working on debugging the error that may be associated with the cloud computing service provider or other technical support organization that are not under the control of the client who is responsible for the confidentiality of the data may not be able to review the actual data values.

Figure 4:
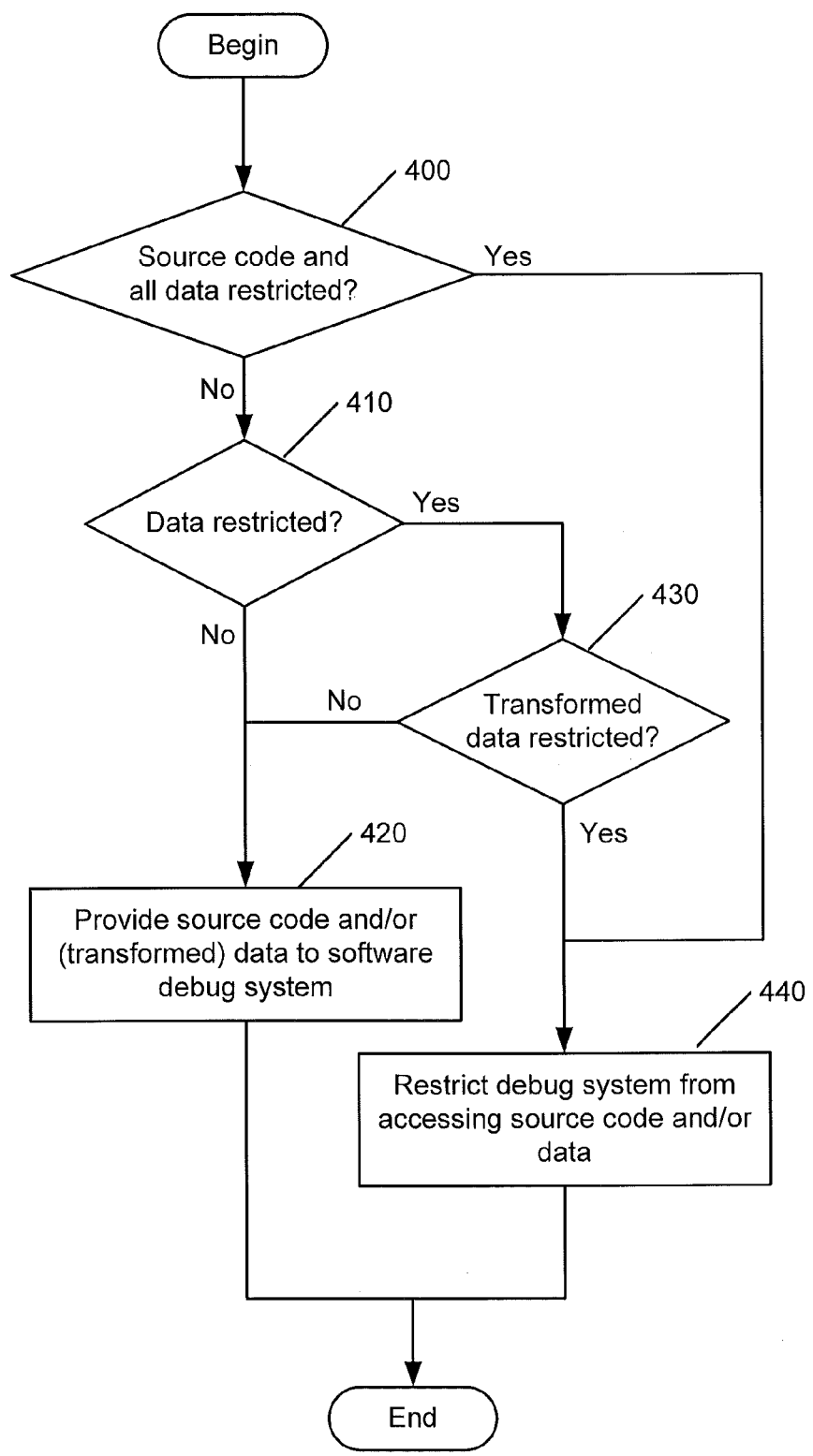

FIG. 4 is a flowchart that illustrates exemplary operations for analyzing an occurrence of an error in a computer program in accordance with further embodiments. Operations begin at block 400 where the program inspection system interface server 210 determines whether the source code and all data associated with a computer program running on a server in the cloud computing service provider infrastructure 230 is restricted. In accordance with some embodiments, source code files, variable names, constants, function names, method names, data structure names, and the like can be identified as being restricted through use of a naming construct. For example, names may be preceded with a prefix indicating that the entity is proprietary information. A source file name may be written as PI_source file.c with the PI_ indicating that access is to be restricted to the entire source file including all the algorithms, functions, data structures, variables, parameters and the like referenced in the source file. Other constructs can also be used that provide multiple levels of access restriction. For example, the prefixes L1PI_, L2PI_, etc. could be used where a first level of authorization is required to view information classified with the L1PI_ prefix where a second level of authorization is required to view information classified with the L2PI_ prefix. FIG. 5 illustrates a policy configuration table that the program inspection system interface server 210 may use to specify to which source code files access is restricted. In the example shown in FIG. 5, tier1 technical support is to be restricted from accessing function definitions source code files with the extension .ksh and .tcl and relating to function names matching the BLOB regular expression: SPI_func_*. Returning to FIG. 4, for files in which the source code and all data are restricted, operations continue at block 440 where a debug system, such as the technical support server 280 of FIG. 2, is restricted from accessing the source code and data identified as proprietary information or Sensitive Personal Information (SPI) during the error analysis and debug process.

If the source code and all the data associated therewith are not restricted, then operations continue at block 410 where the program inspection system interface server 210 determines whether specific data are restricted in the computer program. FIG. 6 illustrates a policy configuration table that the program inspection system interface server 210 may use to specify which data to restrict access to. In the example shown in the second table entry of FIG. 6, tier1 technical support is restricted from viewing the values associated with variable names matching the GLOB regular expression spi_ssn_*. Although the FIG. 6 example illustrates restricted access to variables, it will be understood that other types of data including, but not limited to, functions for procedural programs, methods for objected oriented programs, classes for object oriented programs, function and method parameters, and constants. If no data items are to be given restricted access treatment, then operations continue at block 420 of FIG. 4 where the program inspection system interface server 210 provides the source code and/or data to a debug system, such as the technical support server 280 of FIG. 2.

In some embodiments, however, while a client may not want a third party technical support organization viewing the actual value of a particular variable, for example, in a computer program, it may be possible to transform the value of the variable and allow the third party technical support organization to view the transformed value. The program inspection system interface server 210 determines at block 430 if access can be provided to the values of particular data items if the values are transformed first. FIG. 7 illustrates a policy configuration table that the program inspection system interface server 210 may use to specify data whose values may be transformed so as to provide greater access to a technical support organization. In the example shown in FIG. 7, tier1 technical support is restricted from viewing the values associated with variable names matching the GLOB regular expression spi_ssn_* as indicated by the second table entry. The third table entry, however, restricts tier2 technical support from viewing the values associated with variable names matching the GLOB regular expression spi_ssn_*, but allows tier 2 technical support to view such values if the data values are transformed first in such a manner that tier 2 technical support cannot infer the original values without access to the details of the transformation algorithm used. That is, the transformed data value standing alone cannot be used to infer the original data value. Returning to FIG. 4, if access can be provided to the data if the data is transformed, then operations continue at block 420 where the program inspection system interface server 210 provides the source code and/or data to a debug system, such as the technical support server 280 of FIG. 2. If, however, certain data is so sensitive that a client does not want third parties accessing even transformed versions of the data, then operations continue at block 440 where a debug system, such as the technical support server 280 of FIG. 2, is restricted from viewing the data.

In some embodiments, access to a computer program and its associated data may be restricted based on geography. For example, certain jurisdictions may have laws that govern how certain data can be accessed including limiting access to certain data based on geography. Moreover, organizations may also limit access to certain types of data based on geography, e.g., certain data may not leave a state or country for analysis or processing. In some embodiments illustrated in FIG. 8, tier 2 technical support in the United States is restricted from accessing the data associated with the variable_SPI_ssn.

Figure 10:
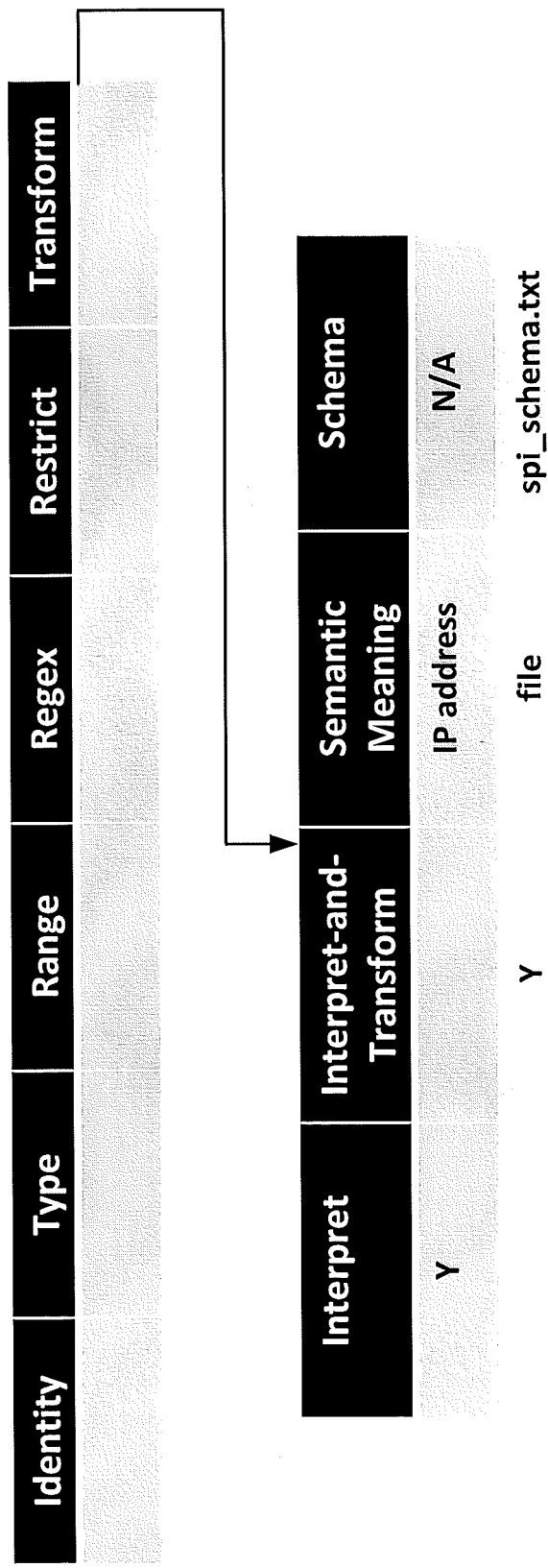
FIG. 10 is a block diagram that illustrates a policy configuration table for analyzing the occurrence of an error in a computer program by restricting access to an external resource that may contain sensitive information according to some embodiments.

Computer programs may use resources that are external to themselves in the course of execution, such as resource 260 shown in FIG. 2. For example, a program may read or write from an external file, may communicate with another entity or piece of hardware or the like. An example of a computer program referencing an external resource is shown in FIG. 9 where the program interacts with an external LOGFILE. When a computer program references an external resource, the program inspection system interface server 210 may evaluate the external resource to determine how to interpret and process the data associated therewith. Access to an external resource may be based on two criteria: 1) whether the external resource is programmatically accessed one or more times in the computer program and 2) whether technical support personnel are authorized to access the resource via the program inspection system interface server 210. As shown in FIG. 10, the program inspection system interface server 210 may use a policy configuration table that includes an "Interpret" field that specifies whether the external resource is bound to a state variable in the computer program. In the example shown, an Internet Protocol (IP) address is associated with a state variable in the computer program. In some embodiments, the external resource is bound to a navigation construct that may be analogous to an HTML link. This may allow technical support personnel to navigate to the resource in the cloud computing service provider infrastructure 230 by accessing the navigation construct. This may allow technical support personnel to navigate to a resource to access the resource for purposes of debugging a computer program error, for example, without revealing details of the location—geographic or electronic, e.g., a network address—to the technical support personnel. In other embodiments, the navigation construct may facilitate contextual access of the resource by technical support personnel by associating one or more security policies with the resource that restrict how the resource is accessed. For example, the security policies may restrict access to the resource's geographic and/or electronic location, may restrict access to one or more data items contained in the resource, may restrict access to the resource based on particular security levels for different technical support personnel, may restrict access to the resource during particular time intervals, etc.

In some cases, the external resource may need to be transformed in some way to process the data contained therein. In the second table entry shown in FIG. 10, the external resource is a file. By specifying the semantic meaning of the resource as a file, a set of semantic dependent operations is bound to the resource, for example, search operations for a file, ping operations for another computer, validate operations for a secure channel protocol, and the like. The second table entry also specifies that a transformation is required to access the data contained in the file. A schema field is used that identifies instructions on how to transform the resource to access the information in the resource. In the example of FIG. 10, a file spi_schema.txt may specify, for example, particular records and fields in a database file from which desired data may be obtained.

Figure 11:
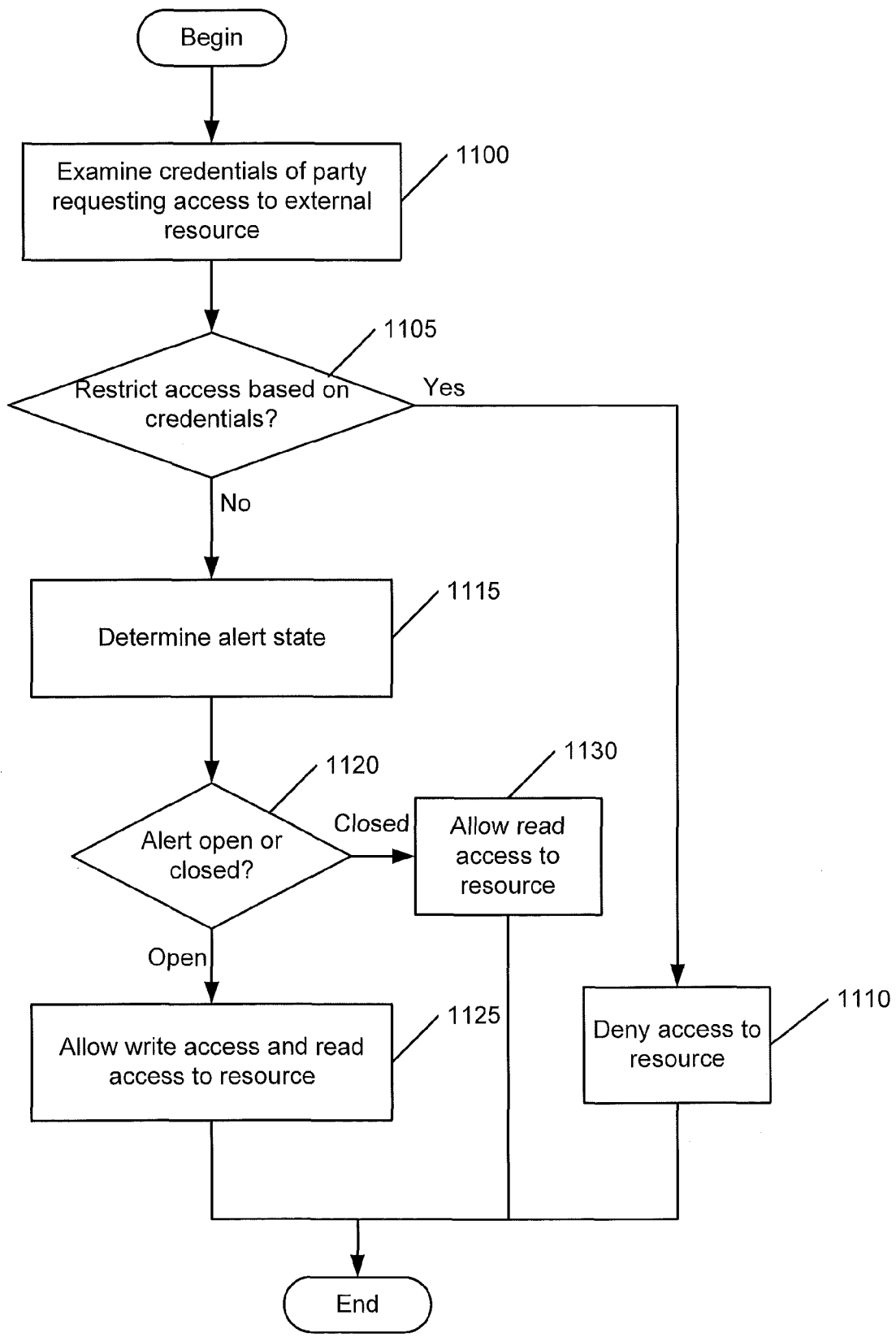
FIG. 11 is a flowchart that illustrates operations for controlling access to an external resource referenced by a software program according to some embodiments.

As described above, access to an external resource may be based on whether technical support personnel are authorized to access the resource via the program inspection system interface server 210. In some embodiments, a multi-stage authorization process may be used to determine whether to grant technical support personnel access to an external resource. Referring now to FIG. 11, exemplary operations of the program inspection system interface server 210 for determining whether to grant a party access to an external resource will be described. Operations begin at block 1100 where the credentials of a party that requests access to an external resource are examined. In accordance with various embodiments, one or more security levels may be assigned, which govern the nature of access to the resource to be granted to a party. For example, technical support personnel with level one access may be granted the ability to both read and write data within the resource. Audit personnel assigned level two access may be granted only the ability to read data within the resource.

A determination is made at block 1105 whether the party requesting access to the resource has the requisite credentials to access the external resource. If the party requesting access does not possess the requisite credentials, then access to the resource is denied at block 1110. If, however, the party requesting access to the resource does possess the requisite credentials, then an evaluation is made at block 1115 of the current state of the program error. For example, a determination may be made at block 1120 whether the alert notifying technical support personnel of the existence of the error is currently open, i.e., the error has not been resolved and/or is still under analysis, or whether alert has been closed, i.e., the error has been resolved and/or is no longer under analysis. In some embodiments, if the alert is still open indicating that technical support personnel are still engaged in investigating the program error, then write access and read access may be granted at block 1125 to assist the technical support personnel in investigating and resolving the program error. If, however, the alert has been closed, then technical support personnel may be granted only read access to the resource at block 1130 as the program error that triggered the alert is no longer under analysis and/or has been resolved. In other embodiments, access to the external resource may be denied altogether once the alert associated with a program error has been closed and the investigation into the program error is complete.

In some embodiments, the occurrence of a software program error may be the event that triggers the opportunity for technical support personnel to access an external resource referenced in the software program. To facilitate this access, a key may be generated based on, for example, an identification number and/or time that the error occurred that allows a technical support organization to access the external resource through the program inspection system interface server 210 for a limited time period or possibly until such time as analysis of the computer program error is closed. In some embodiments, once the software program resumes normal operations, e.g., non-debug mode operations, the access key may be invalidated thereby revoking access to the external resource.

Figure 12:
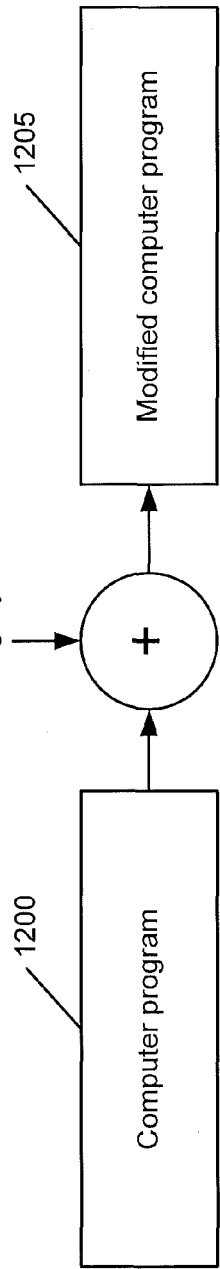
FIG. 12 is a flowchart that illustrates code injection operations for generating a computer program in which access to sensitive information can be restricted during error analysis according to some embodiments.

As described above, to facilitate limiting access to various algorithms and data associated with a computer program during the analysis and debugging of errors that occur during execution of the program, a naming construct may be used to identify which files, data elements, and the like are to be given restricted access treatment. Referring now to FIG. 12, computer programs, such as shell scripts, interpreted language programs, and the like at block 1200 may be modified through the use of code injection to generate a modified computer program at block 1205 that includes security level naming constructs that can be used by the program inspection system interface server 210 to restrict access to certain proprietary information or Sensitive Personal Information (SPI) by third parties involved in analyzing and debugging the computer program upon occurrence of an error.

Figure 13:
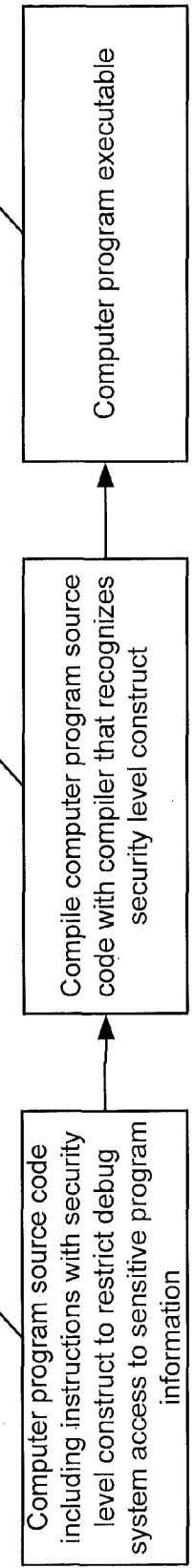
FIG. 13 is a flowchart that illustrates code compilation operations for generating a computer program in which access to sensitive information can be restricted during error analysis according to some embodiments.

Certain types of computer programs, however, may not be well suited for modification through code injection. As illustrated in FIG. 13, at block 1300, these computer programs may be written to include security level naming constructs that can be used by the program inspection system interface server 210 to restrict access to certain proprietary information or Sensitive Personal Information (SPI) by third parties involved in analyzing and debugging the computer program upon occurrence of an error. A compiler that is configured to recognize these constructs is used at block 1305 to compile the computer program so as to generate a computer program executable at block 1310 that can be executed in a cloud computing service provider infrastructure 230. The program inspection system interface server 210 may use the security level naming constructs to restrict access to restrict access to the sensitive information associated with the computer program to only those parties having the requisite credentials.

The flowcharts of FIGS. 3, 4, and 11-13 illustrate the architecture, functionality, and operations of some embodiments of methods, systems, and computer program products for analyzing an occurrence of an error in a computer program by restricting access to data identified as being sensitive information. In this regard, each block represents a module, segment, or portion of code, which comprises one or more executable instructions for implementing the specified logical function(s). It should also be noted that in other implementations, the function(s) noted in the blocks may occur out of the order noted in FIGS. 3, 4, and 11-13. For example, two blocks shown in succession may, in fact, be executed substantially concurrently or the blocks may sometimes be executed in the reverse order, depending on the functionality involved.

According to some embodiments described above, a client that uses a computer program that may contain confidential algorithms and/or data may still run such a program in a cloud computing environment while still being able to protect the confidentiality of the algorithms and data even when errors occur in the execution of the computer program. A program inspection system interface that provides a logical firewall between the cloud server executing the computer program and a technical support entity involved in analyzing and debugging program errors can be used to restrict access to any sensitive information that is identified as such through the use of security level naming constructs used in the computer program. This may allow the clients to take advantage of the flexibility and efficiency of cloud computing without sacrificing confidentiality for sensitive information.

Many variations and modifications can be made to the preferred embodiments without substantially departing from the principles of the present invention. All such variations and modifications are intended to be included herein within the scope of the present invention, as set forth in the following claims.

That which is claimed:

1. A method, comprising:
performing operations as follows on a processor:
receiving data that are associated with an execution leg of a computer program at a time of an error; and
restricting access to a portion of the data associated with the execution leg of the computer program in a memory coupled to the processor based on an identification of the portion of the data associated with the execution leg of the computer program as being sensitive information, a credential of an entity that seeks access to the portion of the data, and a geographic location associated with the entity;

wherein the computer program comprises a variable and the portion of the data comprises a value assigned to the variable during execution of the computer program;

wherein the entity is separate from the computer program;

wherein the portion of the data comprises a resource that is external to the computer program and is accessed by the computer program during execution of the execution leg of the computer program; and wherein the method further comprises:

associating a navigation construct with the resource that is external to the computer program, the navigation construct facilitating access to the resource that is external to the computer program without revealing a location of the resource that is external to the computer program.

2. The method of claim 1, wherein the portion of the data associated with the execution leg of the computer program is identified as being sensitive information in the computer program based on a naming construct used to name the variable in the computer program.

3. The method of claim 1, wherein restricting access to the portion of the data associated with the execution leg of the computer program comprises:

transforming the value assigned to the variable to generate a transformed value; and allowing access to the transformed value;

wherein the transformed value alone cannot be used to determine the value assigned to the variable.

4. The method of claim 1, wherein the variable is a first variable, the method further comprising:

identifying a second variable associated with the resource that is external to the computer program, the second variable having a state on which an occurrence of the error in the computer program is partially based.

5. The method of claim 4, further comprising:

processing the resource that is external to the computer program to obtain a data item contained in the resource.

6. The method of claim 5, further comprising:

restricting access to a value of the data item contained in the resource;

transforming the value of the data item contained in the resource to generate a transformed value of the data item contained in the resource; and allowing access to the transformed value of the data item contained in the resource; wherein the transformed value of the data item contained in the resource alone cannot be used to determine the value of the data item contained in the resource.

7. The method of claim 6, wherein transforming the value of the data item contained in the resource comprises:

defining a schema for transforming data contained in the resource that is external to the computer program; and transforming the value of the data item contained in the resource based on the schema to generate the transformed value of the data item contained in the resource.

8. The method of claim 5, wherein processing the resource that is external to the computer program to obtain the data item contained in the resource comprises:

identifying an operation based on a type of the resource that is external to the computer program; and performing the operation on the resource that is external to the computer program to obtain the data item contained in the resource.

9. The method of claim 1, wherein restricting access to the resource that is external to the computer program comprises:

defining the credential for accessing the resource that is external to the computer program;

determining if the entity that requests access to the resource that is external to the computer program possesses the credential; and denying access to the resource that is external to the computer program when the entity does not possess the credential.

10. The method of claim 9, further comprising:

evaluating a status of the error; and allowing access to the resource that is external to the computer program if the entity does possess the credential based on the status of the error.

11. The method of claim 10, wherein evaluating the status of the error comprises determining that analysis of the error is complete, the method further comprising:

allowing read-only access to the resource that is external to the computer program.

12. The method of claim 10, wherein evaluating the status of the error comprises determining that analysis of the error is in progress, the method further comprising:

allowing read access and write access to the resource that is external to the computer program.

13. A system, comprising:

a processor; and a memory coupled to the processor that contains computer readable program code embodied in the memory that when executed by the processor causes the processor to perform operations comprising:

receiving data that are associated with an execution leg of a computer program at a time of an error; and restricting access to a portion of the data associated with the execution leg of the computer program based on an identification of the portion of the data associated with the execution leg of the computer program as being sensitive information, a credential of an entity that seeks access to the portion of the data, and a geographic location associated with the entity;

wherein the computer program comprises a variable and the portion of the data comprises a value assigned to the variable during execution of the computer program;

wherein the entity is separate from the computer program;

wherein the portion of the data comprises a resource that is external to the computer program and is accessed by the computer program during execution of the execution leg of the computer program; and wherein the operations further comprise:

associating a navigation construct with the resource that is external to the computer program, the navigation construct facilitating access to the resource that is external to the computer program without revealing a location of the resource that is external to the computer program.

14. The system of claim 13, wherein the portion of the data associated with the execution leg of the computer program is identified as being sensitive information in the computer program based on a naming construct used to name the variable in the computer program.

15. The system of claim 13, wherein restricting access to the portion of the data associated with the execution leg of the computer program comprises:

transforming the value assigned to the variable to generate a transformed value; and allowing access to the transformed value;

wherein the transformed value alone cannot be used to determine the value assigned to the variable.

16. The system of claim 13, wherein the variable is a first variable, the operations further comprising:

identifying a second variable associated with the resource that is external to the computer program, the second variable having a state on which an occurrence of the error in the computer program is partially based.

17. The system of claim 16, further comprising:
processing the resource that is external to the computer program to obtain a data item contained in the resource.

18. A computer program product, comprising:
a non-transitory computer readable medium comprising computer readable program code embodied in the medium that when executed by a processor causes the processor to perform operations comprising:
receiving data that are associated with an execution leg of a computer program at a time of an error; and
restricting access to a portion of the data associated with the execution leg of the computer program based on an identification of the portion of the data associated with the execution leg of the computer program as being sensitive information, a credential of an entity that seeks access to the portion of the data, and a geographic location associated with the entity;
wherein the computer program comprises a variable and the portion of the data comprises a value assigned to the variable during execution of the computer program;
wherein the entity is separate from the computer program;
wherein the portion of the data comprises a resource that is external to the computer program and is accessed by the computer program during execution of the execution leg of the computer program; and
wherein the operations further comprise:
associating a navigation construct with the resource that is external to the computer program, the navigation construct facilitating access to the resource that is external to the computer program without revealing a location of the resource that is external to the computer program.

19. The computer program product of claim 18, wherein the portion of the data associated with the execution leg of the computer program is identified as being sensitive information in the computer program based on a naming construct used to name the variable in the computer program.

20. The computer program product of claim 18, wherein restricting access to the portion of the data associated with the execution leg of the computer program comprises:
transforming the value assigned to the variable to generate a transformed value; and
allowing access to the transformed value;
wherein the transformed value alone cannot be used to determine the value assigned to the variable.

21. The computer program product of claim 18, wherein the variable is a first variable, the operations further comprising:
identifying a second variable associated with the resource that is external to the computer program, the second variable having a state on which an occurrence of the error in the computer program is partially based.

22. The computer program product of claim 21, further comprising:
processing the resource that is external to the computer program to obtain a data item contained in the resource.

* * * * *